United States Patent [19]

Hansen

[11] 4,220,230
[45] Sep. 2, 1980

[54] OVERLOAD RELEASE CLUTCH

[76] Inventor: Quinten A. Hansen, Highway 38, Franksville, Wis. 53126

[21] Appl. No.: 25,359

[22] Filed: Mar. 30, 1979

[51] Int. Cl.³ .............................................. F16D 43/20
[52] U.S. Cl. ...................................... 192/56 R; 64/29
[58] Field of Search ................... 192/56 R, 150; 64/29

[56] References Cited

U.S. PATENT DOCUMENTS

| | | | |
|---|---|---|---|
| 954,774 | 4/1910 | Beard | 64/29 |
| 2,775,327 | 12/1956 | Gearhart | 192/56 R |
| 3,127,969 | 4/1964 | Hansen | 192/110 B |
| 3,203,523 | 8/1965 | Gilder et al. | 192/56 R |
| 3,722,644 | 3/1973 | Steinhagen | 192/56 R |
| 3,774,738 | 11/1973 | Steinhagen | 192/56 R |
| 3,835,973 | 9/1974 | Braggins et al. | 192/56 R |
| 3,893,553 | 7/1975 | Hansen | 192/56 R |
| 4,071,092 | 1/1978 | Wallace | 192/150 |
| 4,075,873 | 2/1978 | Geisthoff | 192/56 R |
| 4,142,616 | 3/1979 | Dekoninck | 64/29 |

FOREIGN PATENT DOCUMENTS 1069435  11/1959  Fed. Rep. of Germany ........ 192/56 R
  87260   4/1920  Switzerland ............................ 192/56 R

*Primary Examiner*—Lawrence J. Staab
*Attorney, Agent, or Firm*—James E. Nilles

[57] ABSTRACT

A torque limiting device such as an overload release clutch which releases completely when an overload condition is reached. Torque transmitting means in the form of a plurality of balls shiftably mounted in detents are spring loaded to the driving position, thus providing a torque sensitive drive connection between the input and output members. The clutch also includes means for insuring complete torque release between the input and output members as soon as the predetermined torque load is reached, and complete torque release is maintained until the clutch is manually re-engaged.

5 Claims, 8 Drawing Figures

OVERLOAD RELEASE CLUTCH

BACKGROUND OF THE INVENTION

Releasable torque transmitting couplings have been proposed and used with various degrees of success. These torque limiting devices, commonly referred to as overload release clutches are shown for example in the U.S. Pat. No. 3,835,973 issued Sept. 17, 1974 entitled "Torque Limiting Device". In that device, a ball is located in a detent and the ball is forced into the detent by a second ball at a given angular relationship. The springs 13 used in that device however are not in contact with the main balls, but instead bear against a separate part such as a ball and which is spaced in a circumferential direction from the main force transmitting ball. Thus in overload conditions the parts move circumferentially relative to one another and direct spring pressure on the drive transmitting parts is not obtain, but instead the pressure is transmitted through a secondary means, sometimes resulting in non-constant torque release conditions and inconsistent performance.

Another example of the prior art is shown by my U.S. Pat. No. 3,893,553 issued July 8, 1975 and entitled "Overload Release Clutch" which is also a fully releasing torque overload device, but employs different means for providing the overload release action.

SUMMARY OF THE PRESENT INVENTION

The present invention provides an overload release clutch which is bi-directional in operation and can provide torque overload protection in either rotational direction. The release torque settings are easily and simply made and will repeat accurately because the spring force is applied directly to the torque transmitting balls, there being no levers or other force multiplying mechanisms between the springs and the torque elements. The torque transmitting means includes the torque transmitting balls which are pressed directly into detents in the rotor insuring there is no backlash or torsional looseness when the clutch is engaged. The overload release clutch provided by the present invention has means for insuring its complete release with no friction or drag between the parts. Thus the present overload release clutch provides not only a torque sensitive driving connection between the input and output members, but also insures complete torque release therebetween as soon as the predetermined torque conditions are encountered, and it maintains this complete torque release until the clutch is manually re-engaged.

The invention provides a torque release clutch of the above type having a manual re-engagement means which is quickly and easily accomplished and without the need for special tools.

These and other objects and advantages of the present invention will appear hereinafter as this disclosure progresses, reference being had to the accompanying drawings.

DESCRIPTION OF A PREFERRED EMBODIMENT

Figure 4:
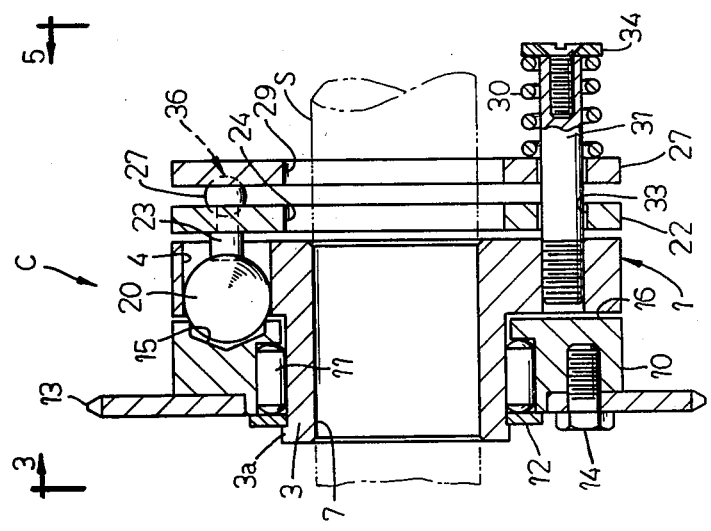
FIG. 4 is a longitudinal, sectional view taken generally along the line 4—4 in FIG. 3.
Figure 3:
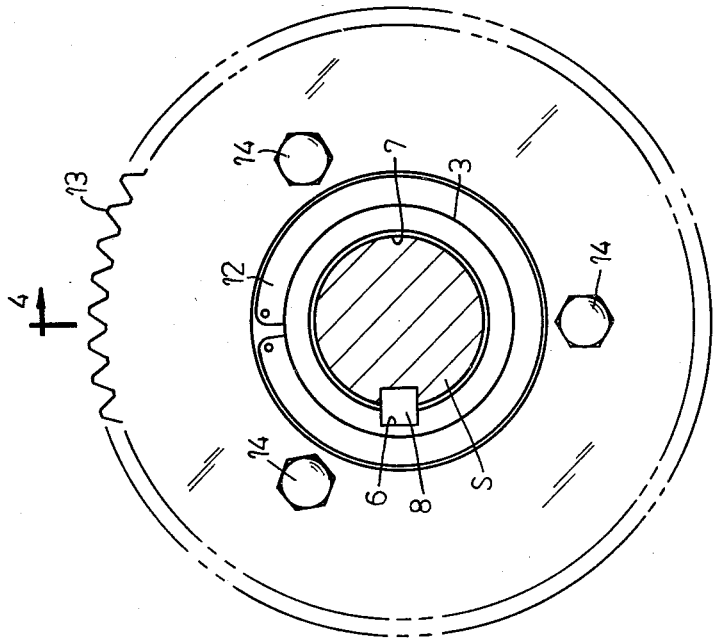
FIG. 3 is an end elevational view of the clutch, the view being taken generally from the line 3—3 in FIG. 4.

The overload release clutch C provided by the present invention is shown as being mounted on a shaft S (FIGS. 3-5) and includes a clutch body 1 having a radially extending flange portion 2 and an axially extending hub portion 3 terminating in a radial shoulder 3a. The flange portion 2 of the body also includes a plurality, for example three, of holes 4 extending axially through the flange and circumferentially spaced therearound. A series of threaded holes 5 also extend through the flange portion 2 and are circumferentially spaced therearound. A keyway 6 is provided in the wall of the central bore 7 extending through the body and key 8 (FIGS. 3 and 5) secures the body to the shaft S. The body also has a transverse surface 9.

The clutch also includes a rotor 10 rotatably mounted on the hub 3 of the body by means of the anti-friction roller bearings 11 and the rotor is held captive thereon by the snap ring 12 mounted on the hub and bearing against the radial shoulder 3a of the hub. A sprocket 13 is secured by cap bolts 14 to the rotor and through which power may be transmitted to or taken from the clutch, depending on which member is driving or being driven.

Figure 1:
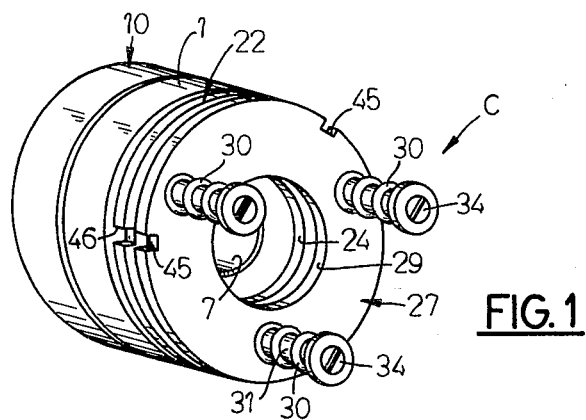
FIG. 1 is a perspective view of an overload release clutch made in accordance with the present invention.
Figure 2:
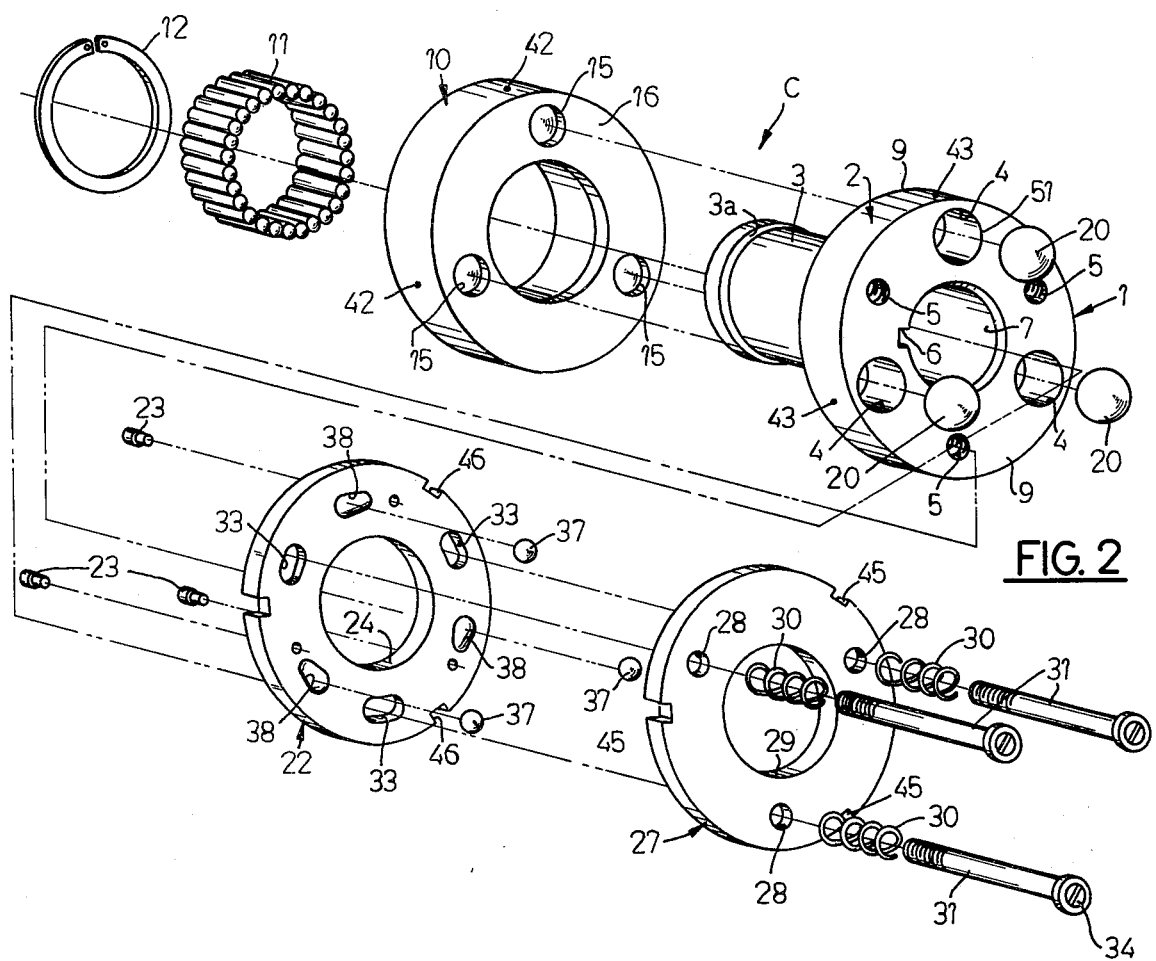
FIG. 2 is a perspective, exploded view of the overload release clutch as shown in FIG. 1.

The rotor has a plurality of detents 15 formed in its transverse surface 16 (FIG. 2). Detents 15 are circumferentially spaced around the rotor, one being provided for each of the holes 4 of the body. The detents are formed as a shallow bore or recess in the rotor and as clearly shown in FIG. 7 for example, have a sharp corner 17.

Torque transmitting means in the form of large balls 20, one mounted in each of the body holes 4 are adapted to also enter their respective detents 15, thereby forming a disconnectible driving connection between the body and rotor. Any number of balls and matching detents may be used.

Figure 5:
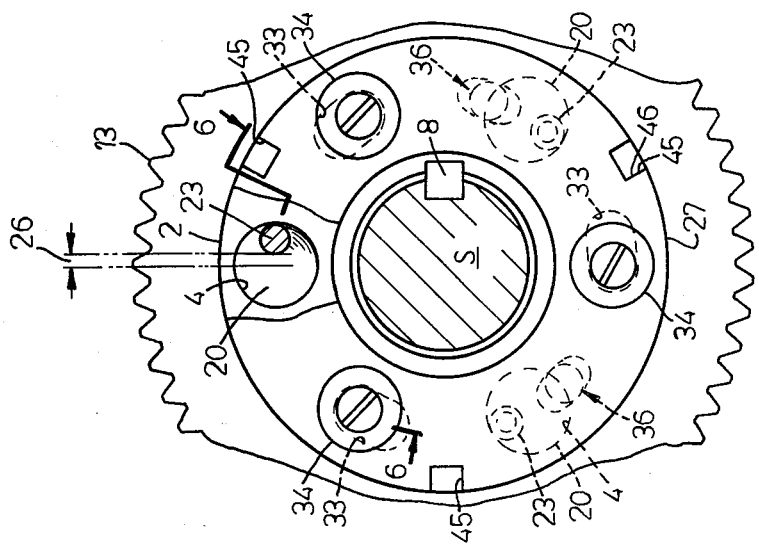
FIG. 5 is a transverse, elevational view taken generally along the line 5—5 in FIG. 4, but furthermore showing certain parts as broken away or in section for the sake of clarity.

The clutch also includes a pressure plate 22 having a series of pins 23 extending axially therefrom and in circumferentially spaced relationship therearound. The number of pins 23 coincides with the number of torque transmitting balls 20 utilized, and the outer ends of the pins 23 are adapted, when the clutch is engaged, to enter the holes 4 (FIG. 6) with one side of the pin bearing against the sidewall of the hole, the other side of the pin pressing directly against the corresponding torque transmitting ball 20, as at 25. As shown in FIG. 5, the distance 26 is the off-center distance between the pin-ball contact point and the center of the ball. Pressure plate 22 has a large central aperture 24 through which shaft S passes.

The clutch includes a spring plate 27 having circumferentially spaced holes 28 and a large central aperture 29 through which shaft S passes, the latter also passing through central opening 24 of plate 22.

The spring loading for the clutch is obtained by the coil springs 30 which are mounted around threaded studs 31 which in turn are threadably engaged in the threaded body holes 5. The studs 31 pass snugly through corresponding holes 28 (FIG. 2) in the spring plate 27 and also pass through elongated openings 33 (FIG. 2) in the pressure plate. An adjusting nut 34 is threadably engaged in the outer ends of the studs for varying the compression force of the springs 30.

The pins 23 press directly against the torque transmitting balls 20 and the entire axial spring force is applied directly against the balls 20 which in turn are pressed into the rotor detents 15. The resulting axial force generates a torsional driving connection between the body 1 and the rotor 10 and this driving torque is proportional to the spring force applied.

In operation, the driving connection will continue until the torque applied creates a tangential force between the rotor detents 15 and the balls 20 which is sufficient to overcome the axial force of the springs 30 exerted against the balls 20. At that point the springs will compress and the balls will retract into the body holes 4 and the rotor 10 will begin to rotate relative to the body 1. The axial spring force is thus exerted against the spring plate 27 which is axially slideable on the studs 31, but the plate is prevented from rotating relative to the body by means of the close fit between the studs 31 and the spring plate holes 28.

When the clutch is thus released, the rotor 10 will rotate until the succeeding detents 15 become aligned with the balls 20 and the springs 30 would then force the balls into the detents with a hard, snap action. This sequence could continue until the drive was stopped or until the driving torque was reduced sufficiently to again establish a driving connection.

The present invention provides not only a torque sensitive drive connection between the input and output members as above noted, but, as will appear, also insures a complete torque release between those members immediately upon the predetermined torque level being reached, and the invention maintains complete torque release until the clutch is manually re-engaged, such re-engagement being accomplished simply, quickly and without the need for special tools.

Figure 6:
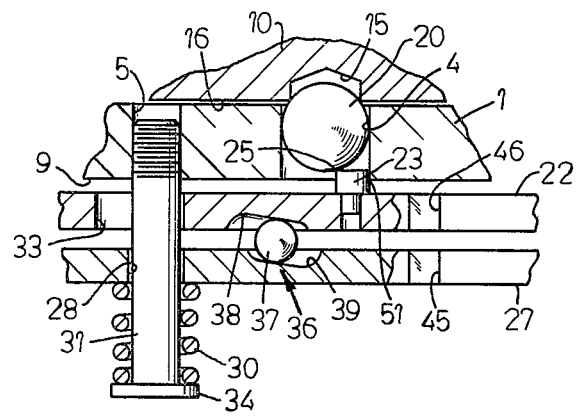
FIG. 6 is a fragmentary, sectional view taken along the line 6—6 in FIG. 5 and showing the relative position of the parts when the clutch is engaged.
Figure 7:
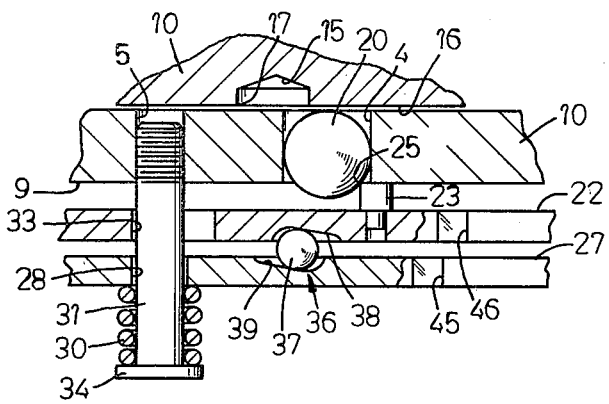
FIG. 7 is a view similar to FIG. 6, but showing the relative position of the parts when the clutch is disengaged.

Referring again to the off-center relationship of the pins 23 in respect to the balls 20, as illustrated in FIGS. 5 and 6, a small tangential force is developed against the side of the pins 23 and the pressure plate 22 which tends to rotate the pressure plate. In other words, the pins 23 are of such diameter that when one side of the pin is contacting the side of the hole 4, the other edge of the pin 23 is pressing against the ball 20 at a slight distance off the axial centerline of the ball. Consequently, there is a small tangential force developed against the pin 23 and pressure plate 22 which tends to rotate the plate. Since the pin extends into the hole 4, the pressure plate 22 cannot rotate until the ball retracts into the hole 4 and the pin 23 escapes from the hole. Thus, as long as the pins 23 extend into the holes 4, the pressure plate 22 cannot rotate until the ball 20 retracts from its detent 15, pushing the pin 23 axially along with it, and the pin 23 then escapes axially from its hole 4 (FIG. 7). At that time the pressure plate 22 ceases to retract axially and instead commences rotating due to the ever-increasing tangential component of the ball force as the ball retracts axially and fully into the hole 4 to escape contact with the rotor 10. When the ball 20 has moved sufficiently to allow its complete withdrawal from the rotor detent 15, the pressure plate 22 is no longer rotated and it stops. At this point the pins 23 are out of the holes 4 and pressing against the transverse surface 9 (FIGS. 7 and 8) of the body 1 and the pins will remain in that position due to the frictional force developed as a result of spring pressure pushing the pins against the body transverse surface 9.

At this stage, the clutch torque is substantially completely released and it will remain in that condition until an outside force is applied to rotate the pressure plate 22 back to its engaged position (FIG. 6). It should be noted that at this stage, the clutch is not completely released because there is still contact between the balls 20 and rotor surface 16, in addition to some small frictional torque still being developed. In some circumstances, the resulting slight drag torque in the clutch would not be unduly objectionable, but the present invention eliminates this residual or drag torque completely as follows.

Figure 8:
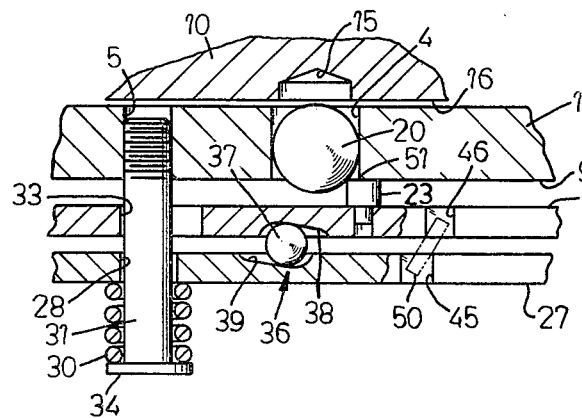
FIG. 8 is a view similar to FIG. 7 showing the relative position of the parts when the clutch is disengaged, but when the body and rotor of the clutch have been circumferentially aligned as by manually rotating them relative to one another and just prior to the pressure plate and spring plate also being circumferentially aligned and which then would immediately cause the clutch to return to the engaged position under the influence of the compression springs.

Cam means 36 (FIGS. 4, 5 and 7) are provided between the pressure plate 22 and the spring plate 27, similar for example to the cam means shown in my U.S. Pat. No. 3,127,969 of Apr. 7, 1964 entitled "Mechanical Clutch of the Compact and Self-Contained Type". The present cam means 36 includes a plurality of small balls 37 which are seated in complementary shaped and oppositely facing depressions 38 and 39 (FIGS. 2 and 8) located in adjoining faces of the pressure plate 22 and spring plate 27, respectively. More specifically, the depressions 38 of the pressure plate 22 have their larger or deeper ends located in a direction circumferentially opposite to the complementary depressions 39 of the spring plate 27 (FIGS. 6, 7 and 8). The depressions 38, 39 form cam ramps for the intervening balls 37, causing axial separation of the plates 22 and 27 as relative rotation between the plates occurs in one direction, and permits the plates to axially move closer to one another when the plates are rotated in opposite relative direction.

The ramps or depressions 38, 39 in the plates hold the balls 37 captive and maintain them equally spaced around the clutch. The small balls 37 function as antifriction bearings between the plates, allowing the pressure plate 22 to rotate slightly (as defined by its elongated holes 33 through which the studs extend) with respect to the spring plate 27. The holes 33 define circumferential limits of rotation of the pressure plate 22 in both directions of rotation relative to the spring plate.

As the pins 23 move axially from the holes 4, the applied spring force working through the small balls 37 and the ramp angles formed by the ramps or depressions 38, 39, actually exert, a rotating force to the pressure plate 22 which is sufficient to overcome the frictional force between the pressure plate pins 23 and the body transverse surface 9 (FIGS. 6-8), and thereby rotate the pressure plate 22 to its limit of motion which occurs when the pressure plate elongated holes 33 abut against their respective studs 31.

The spring generated pressure plate rotation thus completely releases the balls 20 from any rotor contact, thereby resulting in the complete release of the clutch. The clutch will remain released until manually re-engaged.

In order to re-engage the clutch, the rotor 10 and the body 1 are rotated manually relative to one another (FIG. 8) until the rotor detents 15 are axially aligned with the ball holes 4 in the body, index marks 42, 43 on the rotor and body (FIG. 2) being provided for that purpose. The spring plate 27 and pressure plate 22 each have a slot 45, 46, respectively, on their outer peripheries, which slots are in alignment with one another when the clutch is engaged (FIG. 6). When the clutch is released however (FIG. 7), the pressure plate 22 rotates and its slots 46 are rotatably displaced from the matching slots 45 in the spring plate. By inserting a screw driver 50 (FIG. 8) in the plate slots and twisting the screw driver, the plate 22 will rotate relative to plate 27 to cause alignment of their peripheral slots 46, 45. Consequently, as the pressure plate pins 23 move across the sharp edges 51 of the holes 4, the spring force snaps the clutch back into engagement (FIG. 6).

FIG. 8 illustrates the position of the parts when the rotor 10 and body have been rotated by hand relative to one another to cause alignment of the ball hole 4 and the detents 15; the pressure plate 22 and spring plate 27 have not quite yet been aligned to cause the pin 23 to move over and move into its hole 4. The screw driver 50 is ready to be twisted to cause plate 22 to be rotated slightly to where the slots 45 and 46 are axially aligned and the pins 23 then are over the holes 4 and snapped therein, pushing the balls 20 in the rotor detents, causing clutch engagement.

FIG. 6 illustrates the position when the plates 22 and 27 have been aligned by the screw driver and the pins 23 have consequently been snapped into their respective holes 4.

The clutch provided by the present invention is bi-directional in its function regardless of relative rotation between the rotor and body. Torque adjustment is easy and simple because the springs are located externally, are readily accessible and no disassembly is required of them. Release torque settings will repeat accurately and with consistent performance since the spring force is applied axially and directly to the torque transmitting balls, there being no levers or other force multiplying mechanisms between the spring and torque elements. The arrangement is such that the torque transmitting balls are directly pressed into the rotor detents and there is no backlash or torsional looseness when the clutch is engaged. The clutch releases completely with no friction or drag between the rotor and balls. The rotor is mounted on anti-friction bearings and the clutch is therefore suitable for high speed use.

I claim:

1. An overload release clutch comprising: a body rotatable about an axis and having a transverse surface, said body also having a series of circumferentially spaced holes extending in an axial direction and through said surface, a rotor rotatably mounted about said axis and adjacent said body and having a plurality of detents, one detent for each of said holes in said body, said detents being circumferentially alignable with the holes in said body when said clutch is engaged, a ball in each of said holes and engagable in said detents and forming torque transmitting means between said body and rotor, a spring plate, means for shiftably mounting said spring plate to said body, spring means acting between said mounting means and said spring plate for resiliently urging said spring plate towards said body, a pressure plate shiftably mounted on said mounting means and adjacent said transverse surface of said body, said pressure plate located between said body transverse surface and said spring plate, said pressure plate having pins extending into said body holes for off-center engagement with said balls, and cam means between said pressure plate and said spring plate whereby relative rotation between said plates causes variation in the distance between said plates, said spring means bearing against said spring plate and acting through said cam means to urge said pressure plate pins against said torque transmitting balls for causing clutch engagement; whereby when excessive torque loads are imposed upon said clutch, said rotor and body rotate relative to one another thereby causing axial movement of said balls from said detents and consequent clutch disengagement, said axial movement of said balls causing axial movement of said pins out from their respective holes and to bear against said body surface and out of contact with said balls, and thereby permitting said pressure plate to rotate slightly relative to said spring plate thereby actuating said cam means to cause disengagement of said clutch.

2. The clutch set forth in claim 1 further characterized in that said mounting means comprises axially extending studs fixed in said body, and said pressure plate and said spring plate have holes extending therethrough for reception of said studs, said plates being axially shiftable on said studs and relative to one another, and said pressure plates holes are circumferentially elongated to permit relative rotation between said pressure plate and said studs and consequent relative rotation between said pressure plate and said spring plate to thereby permit axial relative movement of said plates by said cam means.

3. The clutch set forth in claim 2 including spring means carried by said studs and acting between said studs and said spring plate to urge the latter together with said pressure plate axially towards said body.

4. The clutch set forth in claim 3 including adjustment means carried by said studs for adjusting the force of said springs against said spring plate and consequently adjusting the torque carrying capacity of the clutch.

5. An overload release clutch comprising: a body rotatable about an axis and having a series of circumferentially spaced holes extending in an axial direction, a rotor rotatably mounted on said body and having a plurality of detents, one detent for each of said holes in said body, said detents being circumferentially alignable with the holes in said body when said clutch is engaged, a ball in each of said holes and engagable in said detents and forming torque transmitting means between said body and rotor, a spring plate, studs threadably engaged in said body and extending axially therefrom and through said spring plate to thereby mount said spring plate on said body, spring means acting between said studs and said spring plate for resiliently urging said spring plate towards said body, a pressure plate mounted on said studs and adjacent a transverse surface of said body, said pressure plate located between said body surface and said spring plate, said pressure plate having pins extending into said body holes for off-center engagement with said balls, and cam means including ball and ramp means between said pressure plate and said spring plate whereby relative rotation between said plates causes variation in the distance between said plates, said spring means bearing against said spring plate and acting through said cam means to urge said pressure plate pins against said torque transmitting balls for causing clutch engagement; whereby when excessive torque loads are imposed upon said clutch, said rotor and body rotate relative to one another thereby causing axial movement of said balls from said detents and consequent clutch disengagement, said axial movement of said balls causing axial movement of said pins out from their respective holes and to bear against said body surface and out of contact with said balls, and thereby permitting said pressure plate to rotate slightly relative to said spring plate thereby actuating said cam means to cause disengagement of said clutch.

* * * * *